Patented Dec. 28, 1943

2,337,873

UNITED STATES PATENT OFFICE 2,337,873

OIL-SOLUBLE RESINOUS COMPOSITION

Gaetano F. D'Alelio, Pittsfield, Mass., assignor to General Electric Company, a corporation of New York No Drawing. Application February 17, 1940, Serial No. 319,515

14 Claims. (Cl. 260—44)

The present invention relates broadly to the production of resinous compositions. It is concerned more particularly with the preparation of oil-soluble resins of the general class consisting of alkyd-modified phenolic resins.

It has been known heretofore that oil-soluble resins can be produced by condensing formaldehyde or the like with certain ortho- and para-substituted phenols, for example phenols substituted in the para position by hydrocarbon radicals containing four to seven or more carbon atoms. The broad suggestion also has been made that such oil-soluble resins may be modified by incorporating therewith substantially neutral resinous bodies, specifically substantially neutral natural resins, polyhydric alcohol-natural resin esters, esterification products of polycarboxylic acids with both monohydric and polyhydric alcohols, and esterification products of polyhydric alcohols with monocarboxylic and polycarboxylic acids.

It also has been known heretofore that alkyd-modified phenolic resins can be so prepared as to yield resinous compositions capable of being poured into molds, that is, cast, and cured therein under the influence of heat to the insoluble, infusible state. Casting resins so made are described, for example, in Kienle and Schlingman Patent No. 2,025,538, which is assigned to the same assignee as the present invention. In accordance with the Kienle and Schlingman invention a flexible alkyd resin is used as an acid catalyst in promoting reaction between phenol and an aldehyde such as paraformaldehyde. In the copending application of Edmond F. Fiedler, Serial No. 204,620, filed April 27, 1938, now Patent No. 2,233,406, and assigned to the same assignee as the present invention, is disclosed the fact that phenol alcohols may be caused to react with flexible alkyd resins having an acid number between 140 and 210 to give satisfactory casting resins. The permanently flexible alkyd resins permitted the production of shock-resistant castings because of the intrinsic flexibility of the alkyd component. The cured, cast resins obtained by both Fiedler and Kienle et al. were insoluble in oils.

The present invention is based on my discovery that new and valuable oil-soluble resinous compositions of particular utility in the production of coating compositions can be produced by effecting reaction between (1) an acidic esterification product of a polyhydric alcohol and polycarboxylic acid comprising essentially an alpha unsaturated alpha beta polycarboxylic acid and (2) an alkaline-catalyzed partial condensation product of an aliphatic aldehyde with an ortho- or para-substituted phenol having two reactive positions in the aromatic nucleus and containing at least four carbon atoms in the substituent grouping. The described esterification product (hereafter, for brevity, designated generally as an "unsaturated alkyd resin") should have pronounced acidity, as evidenced by an acid number of at least 40, but in no case should the acid number be higher than 210. Such definitely acid, partial esterification products are not to be confused with neutral or practically neutral ester bodies having acid numbers of the order of 0 to 20 or 25.

Instead of using an acidic unsaturated alkyd resin of below 210 acid number as an essential reactant in producing an oil-soluble resin, I may use for certain applications of the finished product a flexible alkyd resin, hereafter more particularly identified, of the same acid characteristics as just described with reference to an unsaturated alkyd resin. These incomplete esterification products (acidic unsaturated alkyd resins and acidic flexible alkyd resins) contain both alcoholic hydroxyl groups and carboxylic groups.

Numerous advantages accrue from practicing my invention. For example, films of coating compositions comprising these new resinous bodies dissolved in, or coreacted with fatty oils, specifically drying and semidrying oils, or with other resinous bodies internally modified by such oils, are lighter in color, tougher, brighter and otherwise more generally suitable than are similar compositions comprising a phenolic resin or an alkyd resin alone. Further, the process of producing these new oil-soluble resins requires no special equipment and the properties, particularly flexibility and drying characteristics, of the products can be readily controlled to yield a resin best adapted for the particular service application of the individual coating composition. These improved properties of the fatty oil-resin compositions are believed to accrue at least in part, by reason of the ester exchange that may take place between the ester radicals of these new resins and the ester groupings of the fatty oil. In this way the solubility of the resin in the oil is enhanced beyond that due to the substituent group in the phenolic component. The phenolic component also appears to contribute so-called "oil reactivity" to the oil, whereby the time required for bodying the oil and for drying the films of the resulting varnish are considerably shortened. Coating compositions prepared from oil-soluble resins wherein the hereinafter-identified flexible alkyd resins are utilized are more limited, generally speaking, in their applications (for one reason because they tend to dry to a hard film somewhat more slowly) than similar compositions comprising an unsaturated alkyd-resin-modified phenolic resin. As is well known, unsaturated alkyd resins (even those wherein the alcohol component is dihydric and the acid component is dicarboxylic) are convertible by double-bond polymerization to an insoluble, infusible state. This polymerization characteristic appears to be carried into the intercondensation product of the alkyd resin and the phenolic resin, thereby giving oil solutions of the finished resin somewhat better drying and bodying characteristics than those obtained with a flexible alkyd resin as the modifying reactant. Hence I prefer to use an unsaturated alkyd resin as the alkyd component of my new resinous compositions. Depending mainly upon the particular reactants employed, the proportions thereof and the extent of dehydration, these new resins vary from hard, brittle solids to soft, somewhat tacky masses. All are characterized by their solubility in oils, specifically fatty oils.

In carrying the present invention into effect a substituted phenol of the kind above-mentioned is caused to react, preferably under aqueous conditions, with an aliphatic aldehyde, specifically formaldehyde, in the presence of an alkaline catalyst to form a liquid mass comprising mainly alkylol phenols, specifically methylol phenols (phenol alcohols), or mixtures thereof. This reaction is carried out at normal or at elevated temperatures, usually under reflux at the boiling temperature of the mass.

Illustrative examples of ortho- and para-substituted mono-phenols containing at least four carbon atoms in the substituent group and having two reactive positions in the ring are the butyl phenols, the butyl meta cresols, the amyl meta cresols, the hexyl phenols, the hexyl meta cresols, the octyl phenols, the octyl meta cresols, the phenyl phenols, the tolyl phenols, the xylenyl phenols, the phenyl phenol propanes, the phenyl phenol butanes, the phenyl phenol pentanes, the nuclearly alkylated phenyl phenol alkanes, the coumar phenols, the terpene phenols, etc., or, in general, the type of phenol obtained by chemically uniting a mono-alkene containing at least four carbon atoms to phenol or to a meta-substituted phenol. Substituted phenols of the described class which are particularly suitable for use are ortho- and para-amyl phenols, ortho- and para-indene phenols and ortho- and para-(1-phenethyl) phenols, a specific example of the latter being symmetrical para-phenyl phenol ethane. The para-substituted phenols are preferred to the ortho-substituted bodies, since, other conditions being the same, the para compounds yield resins having somewhat better oil solubility and, particularly, greater light stability.

The choice of the aliphatic aldehyde component is dependent largely upon economic considerations and upon the particular properties desired in the finished product. I prefer to use as the aldehydic component formaldehyde or polymeric modifications thereof such as the polyoxymethylenes, e. g., paraformaldehyde, trioxymethylene, etc. For some applications of the finished resin I may use other aliphatic aldehydes, for example, acrolein, acetaldehyde, propionaldehyde, butyraldehyde, crotonaldehyde, etc., mixtures thereof or mixtures of formaldehyde (or compounds engendering formaldehyde) with some such aliphatic aldehyde. In general, the longer the chain of the aliphatic aldehyde, the softer is the final product.

The ratio of aliphatic aldehyde to the substituted phenol may be varied over a wide range, but preferably is within the range of 1 mol phenol to 1 to 2½ or 3 mols aliphatic aldehyde. Very good results have been obtained by using 1 mol phenol to 1.2 to 2.2 mols formaldehyde. Mol ratios of aliphatic aldehyde to phenol above 3 to 1 are not precluded, for example 4 or 5 mols of aldehyde to 1 mol phenol, but no particular advantages accrue therefrom particularly from the viewpoint of cost per unit yield.

The alkaline catalyst employed advantageously is one which has no darkening effect upon the resin. Hydroxides of the alkaline-earth metals (calcium, strontium and barium) and hydroxides, carbonates, cyanides and borates of the alkali metals (lithium, sodium, potassium, rubidium and caesium) are examples of suitable catalysts. Ammonia and derivatives of ammonia, e. g., the primary, secondary and tertiary amines and imines, likewise may be used if color is of secondary consideration. The amount of catalyst may be considerably varied, but generally is about 0.5 to 5 per cent by weight of the substituted phenol. The nearer the reaction temperature approaches 100° C., the less catalyst is required. For room temperature (20° to 35° C.) reactions, a higher percentage of catalyst is required as compared with reactions carried out under applied heat, and in such cases may approach 10 per cent by weight of the phenolic body. At reaction temperatures of approximately 80° to 90° C. an amount of catalyst ranging from about 0.5 to 3.5 per cent by weight of the substituted phenol is effective.

The substituted phenol and aliphatic aldehyde, e. g., formaldehyde, are intimately associated, for example by mixing and heating, for a period sufficient to form alkylol, specifically methylol, derivatives of the substitued phenol but insufficient to cause the conversion of all of such derivatives to the methylene state. As is well known, when a phenol and an aldehyde are reacted under alkaline conditions, phenol alcohols (alkylol phenols) are formed. Thus when the aldehyde is, for example, formaldehyde, as the reaction proceeds a higher condensation product forms with the loss of methylol groups until eventually all the methylol groups are converted into methylene groups. I have discovered that if an acidic flexible alkyd resin or an acidic unsaturated alkyd resin, not exceeding substantially 210 in acid number, is incorporated into a liquid mass comprising mainly alkylol, specifically methylol, derivatives of the above substituted phenols, such resins can be reacted with these alkylol derivatives to yield resinous masses which, when dehydrated, are particularly valuable for the production of coating compositions of the oil-synthetic resin type. The mixed components may be heated for a suitable time prior to dehydration in order to cause the reaction to go partly or wholly to completion. Or, the mixture immediately may be dehydrated in which case the substituted phenol-aliphatic aldehyde partial condensation product and the acidic alkyd resin co-react to completion simultaneously with the dehydration of the resinous mass.

The acidic alkyd resin is separately prepared, that is, preformed, in accordance with technique now well known to those skilled in the alkyd resin art. Since the scope of this invention involves the co-condensation of an alkylol derivative of a substituted phenol with the alcoholic hydroxyl groups of both acidic unsaturated alkyd resins and acidic flexible alkyd resins, the composition of these resins as utilized in practicing the present invention is discussed briefly below.

ACIDIC UNSATURATED ALKYD RESIN REACTANT

In preparing the acidic unsaturated alkyd resin reactant any polyhydric alcohol containing at least two esterifiable aliphatic hydroxyl groups, or mixtures of such alcohols, may be used. Examples of such polyhydric alcohols are ethylene gloycol, di-, tri- and tetraethylene glycols, propylene glycol, trimethylene glycol, thiodiglycol, glycerine, pentaerythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc. If available, anhydrides of these polycarboxylic acids may be used.

In some cases, instead of using an unmodified acidic unsaturated alkyd resin I may use an unsaturated alkyd resin which has been internally modified by replacing a part, say up to about 75 mol per cent of the alpha unsaturated alpha beta polycarboxylic acid with a non-ethylenic polycarboxylic acid, e. g., a saturated aliphatic polycarboxylic acid such as succinic, adipic, glutaric, pimelic, sebacic, azelaic, suberic, tricarballylic, citric, etc., cyclic polycarboxylic acids, more specifically the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids, e. g., phthalic, benzoyl phthalic, terephthalic, benzophenone-2,4' dicarboxylic acids, etc., or with anhydrides of such acids if available. The term "unsaturated alkyd resin" as used generally herein and in the appended claims is intended to include within its meaning both unmodified esterification products of a polyhydric alcohol with an alpha unsaturated alpha beta polycarboxylic acid and esterification products of the said components which have been modified with a non-ethylenic polycarboxylic acid such as above described and wherein an alpha unsaturated alpha beta polycarboxylic acid forms at least 25 mol per cent of the polycarboxylic acid reaction component.

ACIDIC FLEXIBLE ALKYD RESIN REACTANT

Alkyd resins which are permanently flexible heretofore have been produced, one form of such resins being described and claimed in Kienle and Rohlfs Patent No. 1,897,260, which is assigned to the same asignee as the present invention. Flexible alkyd resins may be prepared, for example, by reacting suitable proportions of an aliphatic dicarboxylic acid, e. g., succinic acid, etc., and a dihydric alcohol, e. g., ethylene glycol, etc., with the usual alkyd resin ingredients, namely a polyhydric alcohol having three or more hydroxyl groups in the molecule, e. g., glycerol, with a nonethylenic polycarboxylic acid, e. g., phthalic acid or anhydride. The term "flexible alkyd resin" as used generally herein is intended to include within its meaning alkyd resins obtained by reaction of a dihydric alcohol or alcohols and a non-ethylenic dicarboxylic acid or acids, with or without less than 50 mol per cent of a reactant selected from the class consisting of polyhydric alcohols containing at least three hydroxyl groups in the molecule, a non-ethylenic polycarboxylic acid containing at least three carboxyl groups in the molecule and mixtures of such polyhydric alcohols and polycarboxylic acids.

The acidic alkyd resins of the "flexible" and "unsaturated" types are produced by suitably reacting the components at an elevated temperature until the acid number has been reduced to below 210, more particularly from 40 to 210. Advantageously the components are reacted, particularly when preparing an unsaturated alkyd resin, in an inert atmosphere such as a nitrogen atmosphere. Generally the components are reacted until from about 55 to 93 per cent of the theoretical water of esterification has been collected. Depending upon the molecular weight of the starting components, the acid number of these alkyd resins, when the ordinary reactants are used, is within the range of 40 to 210. Acidic alkyd resin having an acid number higher than 210 should not be used, since a large excess of unreacted alkyd resin components (indicated by an acid number above 210) has a detrimental effect upon the finished resin and makes more difficult the production of uniform batches from day to day.

The amount of acidic alkyd resin incorporated into the alkylol derivative of the substituted phenol may be varied over a wide range. The optimum proportion of alkyd resin to the phenolic derivative depends upon such influencing factors as, for example, the particular starting components and proportions thereof employed in producing the alkyd and phenolic resins, the particular reaction time and temperatures and the particular properties desired in the end-product. Generally speaking, the alkyd resin component will be not more than 75 per cent by weight of the dehydrated resinous mass, and in most cases will be less than 50 per cent by weight thereof. Particularly good results have been obtained with, by weight, from 5 to 35 per cent alkyd resin to 95 to 65 per cent phenolic resin based on the dehydrated mass.

When a strong base in relatively large amount is employed as a catalyst for the substituted phenol-aliphatic aldehyde reaction, it is sometimes advantageous to use less acidic alkyd resin than would be required to neutralize completely the alkalinity of the phenolic reaction product. In such cases neutralization is completed by adding a suitable amount of an organic carboxylic acid such as acetic, propionic, oxalic, malonic, succinic, adipic, acrylic, methacrylic, polymethacrylic, maleic, fumaric, citraconic, tartaric, citric, lactic, hydroxy malonic, etc. In this way the amount of acidic alkyd resin required for neutralization may be materially reduced.

The new synthetic resins of this invention are soluble in, and co-reactive with drying oil, semi-drying oils, and with synthetic resinous compositions internally modified by such oils, for example oil-modified glyceryl phthalate, diethylene glycol maleate, triethylene glycol maleate, tetraethylene glycol maleate, etc. Illustrative examples of fatty oils, specifically drying and semi-drying oils, which may be used in producing the liquid coating compositions (air-drying and baking varnishes) of this invention are linseed oil, oiticica oil, China-wood oil, perilla oil, soya bean oil, etc.

To the solution of the resinous co-condensation products of this invention may be added suitable driers and the resulting varnish used directly as a protective surface coating material. Or, if desired, the varnish may be bodied by heating at temperatures up to, for example, 250° to 260° C. or more, suitable driers and volatile solvents being added to the bodied oil-resin mass to produce a varnish of the desired viscosity and drying rate. Examples of suitable driers are the metallic naphthenates and linoleates, for instance cobalt and manganese naphthenates and linoleates, cobalt maleate, lead acetate, etc. If the rate of drying is of secondary consideration, the drier may be omitted. Pigments, dyes and other conventional ingredients of varnishes may be added, if desired. Other natural or synthetic film-forming materials, soluble in the oily solutions of the resins of this invention, likewise may be employed to modify the properties of the varnish and of the dried film. These may be, for example, cellulose derivatives such as cellulose nitrate (pyroxylin), cellulose acetate, cellulose butyrate, certain cellulose ethers such as phenyl cellulose, benzyl cellulose, etc., polymerized butyl methacrylate, itaconic esters, particularly the higher molecular weight members such as butyl, amyl, hexyl, decyl, phenyl, cresyl, etc., itaconates, in monomeric or partially or completely polymerized state.

In order that those skilled in the art better may understand how the present invention may be carried into effect, the following examples thereof are given by way of illustration. All parts are by weight.

Example 1

*Preparation of resin*

|  | Parts |
|---|---|
| Para phenyl phenol | 10.6 |
| Aqueous solution of formaldehyde (approximately 37.1% HCHO) | 12.8 |
| Sodium hydroxide in 4 parts water | 0.3 |

The above components were mixed and heated under reflux at boiling temperature (approximately 94°–98° C.) for about 1½ to 2 hours. To the resulting resin syrup was added 13.2 parts of an acidic unsaturated alkyd resin below 210 in acid number. This alkyd resin was prepared by reacting 62 parts (1 mol) ethylene glycol and 98 parts (1 mol) maleic anhydride in a nitrogen atmosphere. The mixed reactants were brought slowly to a temperature of 180° C. and held at 182°–190° C. for 30–45 minutes until about 67% of the calculated water of esterification had been removed. The mixture of acidic alkyd resin and para phenyl phenol-formaldehyde partial condensation product was refluxed for 25 minutes, followed by dehydration under a vacuum of 23 inches of mercury. During dehydration the resinous mass reached a maximum temperature of about 150° C.

*Preparation of coating composition (A)*

|  | Parts |
|---|---|
| China-wood oil | 20.0 |
| Above-described resin | 10.0 |
| Lead acetate | 0.03 |
| Hydrocarbon solvent (thinner) | 40.0 |
| Solution of cobalt and lead drier | 0.5 |

The resin was dissolved in the China-wood oil by heating at 220°–230° C. for about 30 minutes. The hot mass was cooled to about 150° C. and the hydrocarbon solvent then added. The diluted resin solution was cooled to about 70° C., the drier added and the solution then filtered. A base member was coated with the resulting product. The coating dried dust-free in less than 40 minutes at room temperature. The coating composition dried to a light-colored, exceptionally tough film after 48 hours' drying at room temperature.

*Preparation of coating composition (B)*

|  | Parts |
|---|---|
| China-wood oil | 10.0 |
| Above-described resin | 4.0 |
| Glycerine | 0.5 |
| Hydrocarbon solvent | 20.0 |
| Solution of cobalt and lead drier | 0.25 |

The China-wood oil, resin and glycerine were heated to 220°–230° C. for 26 minutes or until an eight-inch string could be formed. The resulting mass was cooled to 150° C. and the hydrocarbon solvent added. After cooling to below 70° C. the drier was added and the whole solution filtered. Upon drying the filtered varnish in film form for 1¼ hours at 85° C. a clear, hard, tough film was obtained. It dried to a dust-free condition in 1¼ hours at room temperature.

Example 2

*Preparation of resin*

|  | Parts |
|---|---|
| Para tertiary amyl phenol | 40.0 |
| Aqueous solution of formaldehyde (approximately 37.1% HCHO) | 40.0 |
| Sodium hydroxide in 10 parts water | 1.2 | were refluxed for about 2 hours, yielding a mixture of methylol derivatives of para tertiary amyl phenol. To this methylol condensation product was added 10 parts of an acidic ethylene glycol maleate prepared as described in Example 1. The mixed reactants were refluxed for about 10 minutes, followed by dehydration under a vacuum of 25.5 inches of mercury, during which time a maximum temperature of about 100° C. was reached.

*Preparation of coating composition*

|  | Parts |
|---|---|
| China-wood oil | 20.0 |
| Above-described resin | 10.0 |
| Hydrocarbon solvent | 40.0 |
| Lead acetate | 0.03 |
| Solution of cobalt drier | 0.5 |

The resin was dissolved in the China-wood oil by heating to a temperature of about 220°–235° C. for about 15 minutes or until an eight-inch string could be formed. The drier and solvent were added as in Example 1(A) and the varnish filtered. This varnish dried to a dust-free condition in about 30 minutes at room temperature. After 48 hours' drying at room temperature, the varnish film was tough, flexible and very light in color.

Example 3

*Preparation of resin*

|  | Parts |
|---|---|
| Para tertiary butyl phenol | 18.75 |
| Aqueous solution of formaldehyde (approximately 37.1% HCHO) | 20.0 |
| Sodium hydroxide in 5 to 10 parts water | 0.375 | were mixed and refluxed for about 45 minutes, yielding a liquid mass comprising mainly methylol derivatives of para tertiary butyl phenol. To this liquid mass was added 5 parts of an acidic ethylene glycol maleate prepared as described under Example 1. The mixture was refluxed for about 15 minutes, followed by dehydration under a vacuum of 40 mm. of mercury. During dehydration a maximum resin temperature of about 150° C. was reached.

*Preparation of coating composition*

|  | Parts |
|---|---|
| China-wood oil | 20.0 |
| Above-described resin | 10.0 |
| Hydrocarbon solvent | 40.0 |
| Solution of cobalt and lead drier | 0.5 |

The above components were mixed and bodied as described under the preceding examples. This coating composition yielded a hard, tough, flexible film after heating for 1¼ hours at 85° C.

EXAMPLE 4

To a methylol condensation product prepared as described under Example 3 was added 5 parts of an acidic ethylene glycol itaconate of less than 210 acid number. This itaconic ester was prepared by reacting 65 parts itaconic acid and 31 parts ethylene glycol as described under Example 1 until about 80% of the calculated water of esterification had been collected. The mixed components were heated under reflux for 55 minutes, followed by dehydration as described under Example 3.

*Preparation of coating composition*

|  | Parts |
|---|---|
| China-wood oil | 20.0 |
| Above-described resin | 10.0 |
| Hydrocarbon solvent | 40.0 |
| Solution of cobalt and lead drier | 0.5 | were mixed and bodied as described under Example 1. A base member coated with a sample of this varnish yielded a clear, tough, flexible varnish film after 3 to 4 hours' baking at 85°–90° C.

EXAMPLE 5

*Preparation of resin*

|  | Parts |
|---|---|
| Para phenyl phenol | 21.25 |
| Aqueous solution of formaldehyde (approximately 37.1% HCHO) | 20.0 |
| Sodium hydroxide in 10 parts water | 0.49 | were mixed and refluxed for 45 minutes, yielding a liquid resinous mass formed mainly of methylol derivatives of para phenyl phenol. To this liquid mass was added 5 parts of an acidic ethylene glycol itaconate prepared as described under Example 4. The mixed components were refluxed for 15 minutes and then dehydrated at 40 mm. mercury vacuum to an internal resin temperature of about 130° C.

*Preparation of coating composition*

Same formula as given in Example 4 with the exception that the above-described resin was employed as the resin component. The method of compounding the materials was essentially the same as described in Example 1. The resulting varnish yielded a clear, hard, tough film when dried for 1¼ hours at room temperature.

EXAMPLE 6

*Preparation of resin*

|  | Parts |
|---|---|
| Para tertiary amyl phenol | 20.0 |
| Aqueous solution of formaldehyde (approximately 37.1% HCHO) | 20.0 |
| Sodium hydroxide in 4 parts water | 0.6 | were mixed and refluxed at the boiling temperature of the reactants for about 1 hour. To the resulting methylol condensation product was added 5 parts of an acidic ethylene glycol succinate of less than 210 acid number. This succinate was prepared by esterifying 62 parts ethylene glycol with 116 parts succinic acid by heating the reactants together for about 2¼ hours at 195°–203° C. The mixed components were refluxed for about 45 minutes, followed by dehydration under a vacuum of 18 inches of mercury to an internal resin temperature of 155° C. The dehydrated mass was an oil-soluble, exceptionally light-colored resin.

*Preparation of coating composition*

The same components and proportions as described under Example 2 were used, with the exception that the above-described resin was employed. The China-wood oil and resin were mixed and heated at about 220°–230° C. for about 50 minutes or until an eight-inch string could be drawn. The hot mass was cooled to about 150° C. and the lead acetate and hydrocarbon solvent added to the cooled solution. The cobalt drier solution was added at room temperature, after which the liquid mass was filtered. A sample of the filtered varnish dried dust-free in about one hour at room temperature. A hard, clear, flexible film was obtained after 48 hours' drying at room temperature.

EXAMPLE 7

Same proportions of para phenyl phenol, aqueous formaldehyde and sodium hydroxide and the same procedure as described in Example 5. To the methylol condensation product was added 5 parts of acidic ethylene glycol succinate prepared as described in Example 6. The mixed components were refluxed for 15 minutes, after which the mass was dehydrated under a vacuum of 40 mm. mercury to an internal resin temperature of 137° C.

*Preparation of coating composition*

Same components and proportions as described in Example 3 with the exception that the above resin was employed. The resin was dissolved in the oil and the mass heated at 220°–230° C. for about 17 minutes or until an eight-inch string could be formed. The hydrocarbon solvent was added as the bodied varnish cooled to 150° C., followed by the addition of the drier at a temperature below 60° C. The solution was filtered and then used in coating various metallic and wooden articles. The resin film dried to a dust-free state after heating for 1¼ hours at about 85° C. It dried to a hard, clear, flexible state after heating about 3 hours at that temperature.

EXAMPLE 8

Same components and proportions of para tertiary butyl phenol, aqueous formaldehyde and sodium hydroxide and the same procedure in preparing the methylol derivative as described in Example 3. To the methylol condensation product was added 5 parts of an acidic ethylene glycol succinate prepared as described in Example 6. The mixed components were refluxed for 15 minutes, followed by dehydration at 40 mm. mercury vacuum to an internal resin temperature of 145° C.

*Preparation of coating composition*

Same components and proportions as described in Example 5 with the exception that the above resin was used. The method of compounding the ingredients also was essentially the same as described in the preceding examples. This varnish required a little longer drying time (to reach the same hardness) at room temperature or at elevated temperatures, for example 85° C., than the varnish of Example 7.

The present invention is separate and distinct from the invention disclosed and claimed in my copending application Serial No. 319,516, filed concurrently herewith and assigned to the same assignee as the present invention. In that application I broadly claimed a resinous reaction product of an alkaline-catalyzed partial condensation product of a phenol and an aliphatic aldehyde with an acidic unsaturated alkyd resin having an acid number not higher than 210. Specific claims were directed to casting resins obtained by reaction of such unsaturated alkyd resins and a partial condensation product of formaldehyde with a phenol having the graphic formula

where R is a member of the group consisting of hydrogen, and aryl, alkyl and alkoxy radicals

What I claim as new and desire to secure by Letters Patent of the United States is:

1. A composition comprising an oil-soluble, dehydrated resinous reaction product of ingredients consisting of (1) a preformed acidic unsaturated alkyd resin having an acid number of at least 40 and not higher than 210 obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, and (2) a liquid alkaline-catalyzed partial condensation product of ingredients consisting of formaldehyde and a substituted phenol selected from the class consisting of ortho-substituted and para-substituted phenols having two reactive positions in the aromatic nucleus and containing at least four carbon atoms in the substituent grouping, said alkyd resin constituting from 5 to 50 per cent by weight of the said dehydrated resinous reaction product.

2. As a new product, the oil-soluble dehydrated resinous reaction product of ingredients consisting of (1) a preformed acidic unsaturated alkyd resin having an acid number of at least 40 and not higher than 210 obtained by incomplete reaction of ingredients consisting of a polyhydric alcohol and an alpha unsaturated alpha beta polycarboxylic acid and (2) a methylol derivative of a substituted phenol selected from the class consisting of ortho-substituted and para-substituted phenols having two reactive positions in the aromatic nucleus and containing at least four carbon atoms in the substituent grouping, said alkyd resin constituting from 5 to 50 per cent by weight of the said dehydrated resinous reaction product.

3. A product as in claim 2 wherein the substituted phenol is a para-substituted amyl phenol.

4. A product as in claim 2 wherein the substituted phenol is a para-substituted indene phenol.

5. A product as in claim 2 wherein the substituted phenol is a para-substituted 1-phenethyl phenol.

6. A composition as in claim 1 wherein the preformed unsaturated alkyd resin is a preformed acidic polyhydric alcohol itaconate having an acid number of at least 40 and not higher than 210.

7. A composition as in claim 1 wherein the preformed unsaturated alkyd resin is a preformed acidic polyhydric alcohol maleate having an acid number of at least 40 and not higher than 210.

8. A composition as in claim 1 wherein the preformed unsaturated alkyd resin is a preformed acidic polyhydric alcohol fumarate having an acid number of at least 40 and not higher than 210.

9. As a new product, the oil-soluble dehydrated resinous reaction product of ingredients consisting of (1) a methylol derivative of a para-substituted amyl phenol and (2) a preformed acidic polyhydric alcohol itaconate consisting of the incomplete reaction product of ingredients consisting of a polyhydric alcohol and itaconic acid and having an acid number of at least 40 and not higher than 210, said polyhydric alcohol itaconate constituting from 5 to 35 per cent by weight of the said dehydrated resinous reaction product.

10. As a new product, the oil-soluble dehydrated resinous reaction product of ingredients consisting of (1) a methylol derivative of a para-substituted indene phenol and (2) a preformed acidic polyhydric alcohol maleate consisting of the incomplete reaction product of ingredients consisting of a polyhydric alcohol and maleic acid and having an acid number of at least 40 and not higher than 210, said polyhydric alcohol maleate constituting from 5 to 35 per cent by weight of the said dehydrated resinous reaction product.

11. As a new product, the oil-soluble dehydrated resinous reaction product of ingredients consisting of (1) a methylol derivative of a para-substituted 1-phenethyl phenol and (2) a preformed polyhydric alcohol fumarate consisting of the incomplete reaction product of ingredients consisting of a polyhydric alcohol and fumaric acid and having an acid number of at least 40 and not higher than 210, said polyhydric alcohol fumarate constituting from 5 to 35 per cent by weight of the said dehydrated resinous reaction product.

12. A product as in claim 11 wherein the para-substituted 1-phenethyl phenol is symmetrical para-phenyl phenol ethane.

13. A liquid coating composition comprising a drying oil having incorporated therein the oil-soluble dehydrated resinous reaction product of ingredients consisting of (1) a preformed acidic unsaturated alkyd resin having an acid number of at least 40 and not higher than 210 obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid component, and (2) a liquid alkaline-catalyzed partial condensation product of ingredients consisting of formaldehyde and a substituted phenol selected from the class consisting of ortho-substituted and para-substituted phenols having two reactive positions in the aromatic nucleus and containing at least four carbon atoms in the substituent grouping, said alkyd resin constituting from 5 to 35 per cent by weight of the said dehydrated resinous reaction product.

14. The method which comprises effecting reaction at a temperature not exceeding substantially 100° C. between ingredients consisting of an aqueous solution of from 1 to 5 mols formaldehyde and 1 mol of a substituted phenol selected from the class consisting of ortho-substituted and para-substituted phenols having two reactive positions in the aromatic nucleus and containing at least four carbon atoms in the substituent grouping, said reaction being carried out in the presence of an alkaline catalyst for a period sufficient to form a liquid mass comprising a methylol derivative of the said phenol, reacting with the said liquid mass a preformed acidic unsaturated alkyd resin having an acid number of at least 40 and not higher than 210 obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, and the amount of the said alkyd resin being such that it constitutes from 5 to 35 per cent by weight of the dehydrated mass, and dehydrating the resulting reaction product under reduced pressure, the dehydrated product being characterized by its solubility in fatty oils.

GAETANO F. D'ALELIO.